(12) United States Patent
Musa et al.

(10) Patent No.: US 11,474,868 B1
(45) Date of Patent: Oct. 18, 2022

(54) SHARDED POLLING SYSTEM

(71) Applicant: Amazon Technologies, Inc., Seattle, WA (US)

(72) Inventors: Somar Musa, Vancouver (CA); Jakub Wojciak, West Vancouver (CA); Bernardo Vecchia Stein, Vancouver (CA); Shunjia Ding, Richmond (CA)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 16/698,758

(22) Filed: Nov. 27, 2019

(51) Int. Cl.
*G06F 9/50* (2006.01)
*G06Q 30/02* (2012.01)
*G06F 9/52* (2006.01)

(52) U.S. Cl.
CPC .......... *G06F 9/5027* (2013.01); *G06F 9/526* (2013.01); *G06Q 30/0203* (2013.01)

(58) Field of Classification Search
None
See application file for complete search history.

(56) References Cited

U.S. PATENT DOCUMENTS

| | | | | |
|---|---|---|---|---|
| 8,037,024 B1 * | 10/2011 | Bozkaya | ............... | G06F 16/275 707/637 |
| 8,336,058 B1 | 12/2012 | Geisinger et al. | | |
| 8,935,579 B2 | 1/2015 | Jann et al. | | |
| 8,959,530 B1 * | 2/2015 | Leonard | ................. | G06F 9/546 719/314 |
| 9,350,597 B1 * | 5/2016 | Wong | ...................... | H04L 29/06 |
| 9,495,296 B2 * | 11/2016 | Subramanyam | ..... | G06F 12/0848 |
| 9,753,802 B1 * | 9/2017 | Shipilov | ............. | G06F 11/1443 |
| 9,792,349 B2 * | 10/2017 | Bose | ........................ | G06F 16/27 |
| 9,996,404 B2 * | 6/2018 | Jaiswal | ................... | G06F 9/546 |
| 10,678,614 B2 * | 6/2020 | Singh | .................. | G06F 12/0868 |
| 11,099,917 B2 * | 8/2021 | Hussels | ................. | G06F 9/5066 |
| 11,102,139 B1 * | 8/2021 | Deng | ................. | H04L 47/6295 |
| 11,243,953 B2 * | 2/2022 | Wagner | ................. | G06F 16/951 |
| 2002/0118695 A1 * | 8/2002 | De Cnodder | ....... | H04L 12/4013 370/428 |

(Continued)

OTHER PUBLICATIONS

Li et al.; "Performance Modeling of Systems using Fair Share Scheduling with Layered Queueing Networks"; Carleton University, IEEE 2009; (Li_2009.pdf; pp. 1-10) (Year: 2009).*

*Primary Examiner* — Hiren P Patel
(74) *Attorney, Agent, or Firm* — Robert C. Kowert; Kowert, Hood, Munyon, Rankin & Goetzel, P.C.

(57) ABSTRACT

A shard polling system fairly distributes stored items from producers to consumer processes and includes polling threads that poll for items from respective portions of a storage source, place the items in respective queues, and increment a global permit counter, restricted to a configurable maximum, that tracks the quantity of messages across the respective queues. The polling threads are restricted by respective shard permit counters that limit a quantity of items that may be moved from a storage source to a respective queue. A global thread applies a fairness technique, such as round robin, to fairly obtain the items from each of the respective queues and places the items in a global queue, decrementing the global permit counter, and incrementing the respective shard permit counter for each item obtained. Consumer threads poll the global queue (e.g., a blocking output queue) for the messages.

20 Claims, 7 Drawing Sheets

(56) References Cited

U.S. PATENT DOCUMENTS

| | | | | |
|---|---|---|---|---|
| 2002/0176429 | A1* | 11/2002 | Calvignac | H04L 49/9063 |
| | | | | 370/411 |
| 2014/0115591 | A1* | 4/2014 | Chen | G06F 9/5027 |
| | | | | 718/102 |
| 2014/0372489 | A1* | 12/2014 | Jaiswal | G06F 16/2365 |
| | | | | 707/812 |
| 2017/0111301 | A1* | 4/2017 | Robinson | H04L 51/14 |
| 2018/0054302 | A1* | 2/2018 | Shveykin | H04L 9/0894 |
| 2018/0081745 | A1* | 3/2018 | Jaiswal | G06F 9/546 |
| 2019/0079929 | A1* | 3/2019 | Annamalai | G06F 16/214 |
| 2019/0163545 | A1* | 5/2019 | Singh | G06F 16/22 |
| 2019/0392051 | A1* | 12/2019 | Damyanov | G06F 16/1873 |
| 2020/0128094 | A1* | 4/2020 | De Lavarene | G06F 16/2282 |
| 2020/0250171 | A1* | 8/2020 | Yin | G06F 16/27 |
| 2021/0263663 | A1* | 8/2021 | Bansal | G06N 5/04 |

\* cited by examiner

SHARDED POLLING SYSTEM

BACKGROUND

Computing systems, such as those found in large-scale service providers include computing resources, either storage or compute resources that are accessed by various customers clients, processes or the like (e.g., computer systems with producers and consumers of data). It can be difficult to implement services in a manner such that the services are provided fairly among the processes or customers requesting access to the resources. For example, in some systems, large data production by one producer (e.g., requests either to store or access data) may monopolize resources to such an extent that smaller data production from other producers are delayed. Previous techniques, such as throttling may depend upon predicting future load, which may provide unpredictable, unfair results.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

Systems and methods for polling of computer resources are provided. The disclosed shard polling system may be used in various different contexts, such as systems where producers produce data or items that are consumed by data consumers (a producer-consumer-type environment) as one example. A shard polling system may implement a fairness algorithm that facilitates fair distribution of the produced data to the consuming processes, in embodiments. An example fairness algorithm is a mechanism that when polled, returns data, such as items or messages, etc. chosen fairly from a data source, in embodiments.

Generally, various producers of data such as items (e.g., messages, in some instances described herein) provide the data to a sharding system that stores the data in shards. The producers may be a single producer or numerous distinct producers, in various embodiments. In embodiments, consumer processes consume the items. For example, consumer processes may obtain items (e.g., messages that contain instructions) from the shards and perform actions or tasks described in the items. A shard polling system, in-between the sharding system and the consumer processes may facilitate fair distribution of the items stored in the sharding system, in embodiments.

A shard polling system may include a number of components, in various embodiments. At a high level, a number of shard item pollers poll items from the shards and place the items into shard queues, and a global process applies a fairness algorithm to move the items from the numerous shard queues into a single global output queue of a global poller in a fair manner, for example. A polling process of shard item poller may, before polling a shard for items, ask a shard permit counter for how many permits are available (or if any are available), then fetches that number of items from the source and puts them in a shard queue, in embodiments. Every item that is put in the shard queue releases a global permit to a global permit counter and a global round-robin thread acquires a permit from the global permit counter and in round-robin order, goes to each shard queue and gets a message from the shard queue and put the messages into a global output queue, that is polled by outside consumers that then process the items, for example. An architecture of counters and permits may act as a restriction on the flow of items in the system, in embodiments. Each or either of shard permit counters or global permit counters may be associated with a maximum permit count size, in embodiments. The number of permits in the system may be a tunable parameter, in some embodiments.

In another example, a number of shard pollers obtain items from different shards that act as sources of items. Each shard poller may include a shard queue that enqueues items from an assigned one of the shard sources, and a shard permit counter that stores a permit count that indicates a quantity of available entries in that shard queue. Each shard poller may also include a shard polling process that obtains a quantity (e.g., one or more) of shard permits from the shard permit counter, decrements the shard permit counter by the obtained quantity, polls the assigned shard source for the quantity of items (the polling restricted by the obtained quantity of shard permits), puts each obtained item in a shard queue, and increments a global permit counter for each item put into the shard queue. In some embodiments, a number of shard item pollers each include a shard queue loaded with some number of items from the shards, and the shard queues are polled by a global process or global poller.

Generally, a global poller acts to move the items in those shard queues to a global output queue, in embodiments. For example, a global poller may include a global permit counter, global output queue to queue items from respective shard queues and output items to consumers, and a global process. The global process may check the global permit counter for an available global permit, decrement the global permit counter in response to obtaining a global permit, and select a next shard of the respective shard queues of the plurality of shard items pollers according to a fairness algorithm. The global process may also, in response to obtaining an item from the selected next shard queue, increment the respective shard permit counter for the selected next shard queue and add the obtained item to the global output queue, in embodiments. A global output queue may be associate with a maximum queue size parameter that restricts the size of the global output queue.

Figure 1:
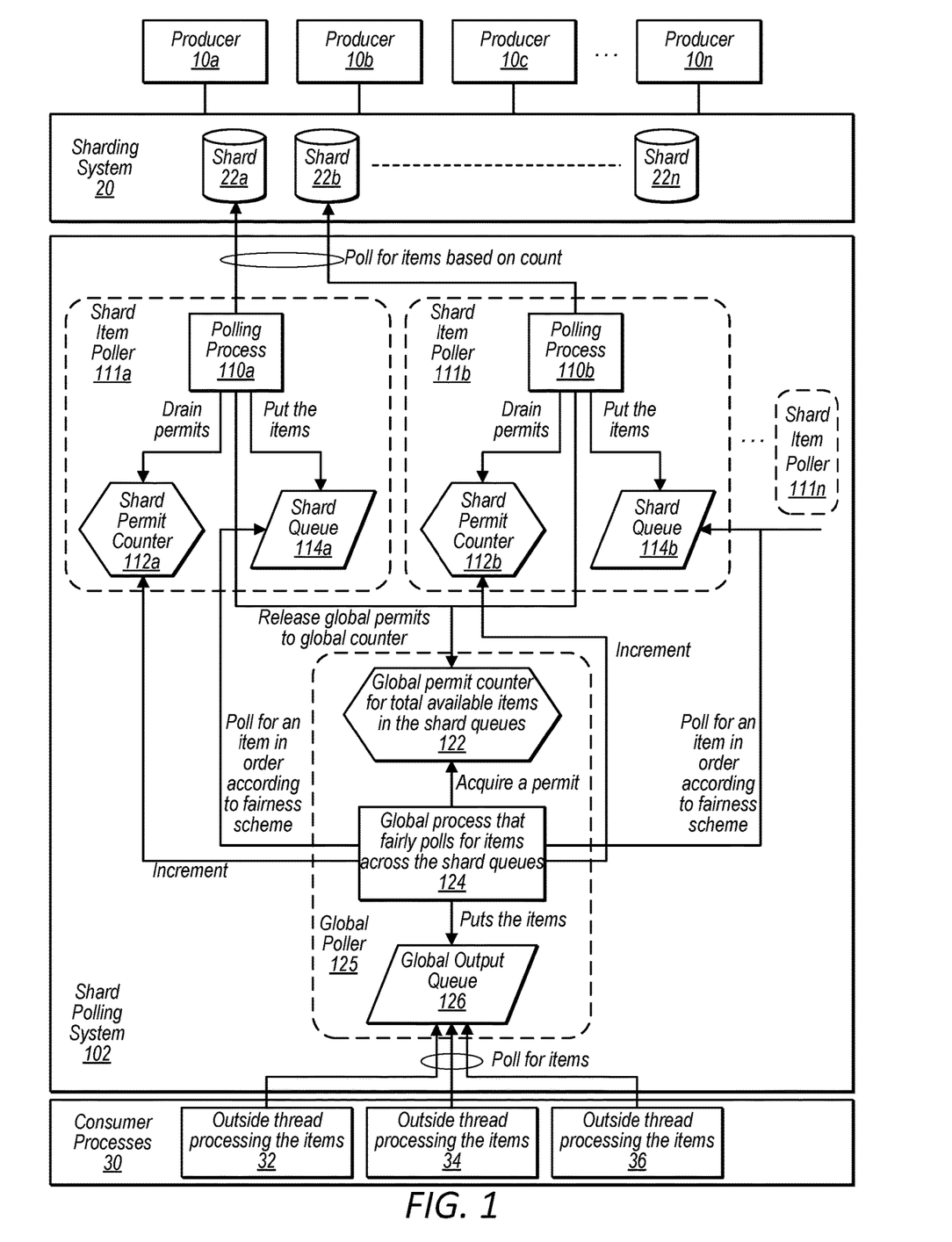
FIG. 1 illustrates a shard polling system for polling of computer resources in accordance with some embodiments.
Figure 2:
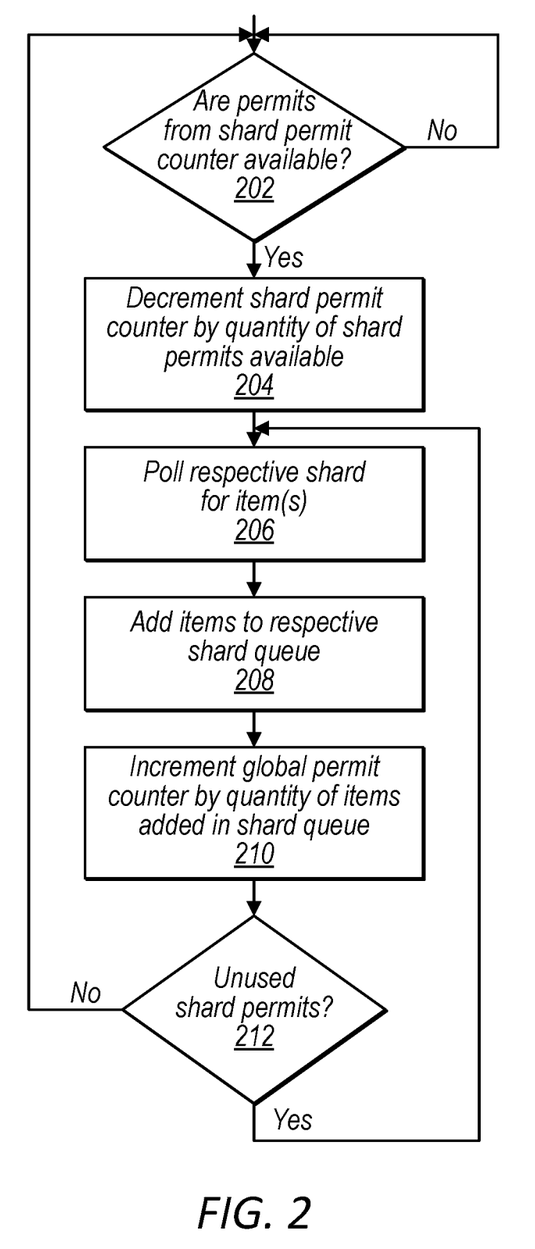
FIG. 2 is a flow chart of a process for polling of computer resources, by components of a shard polling system, in accordance with some embodiments.
Figure 3:
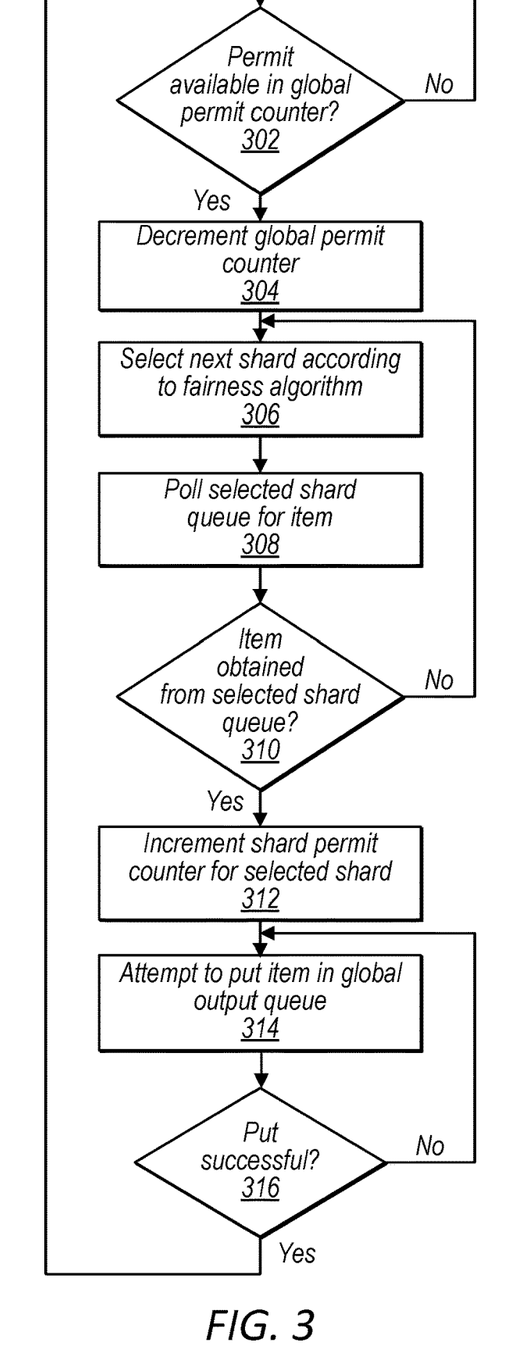
FIG. 3 is a flow chart of a process for polling of computer resources, by components of a shard polling system, in accordance with some embodiments.

FIGS. 1-6 are provided and illustrate systems, components, processes and various environments that may implement and/or interact with a shard polling system. FIG. 1 illustrates an example shard polling system in a producer-consumer environment. FIGS. 2 and 3 illustrates a polling process that may be performed by the shard polling system. FIGS. 4A, 4B and 4C illustrate a shard polling system in a service provider environment, a process of monitoring performance and tuning a shard polling system, and a scaled architecture of multiple shard polling systems, respectively.

Figure 4A:
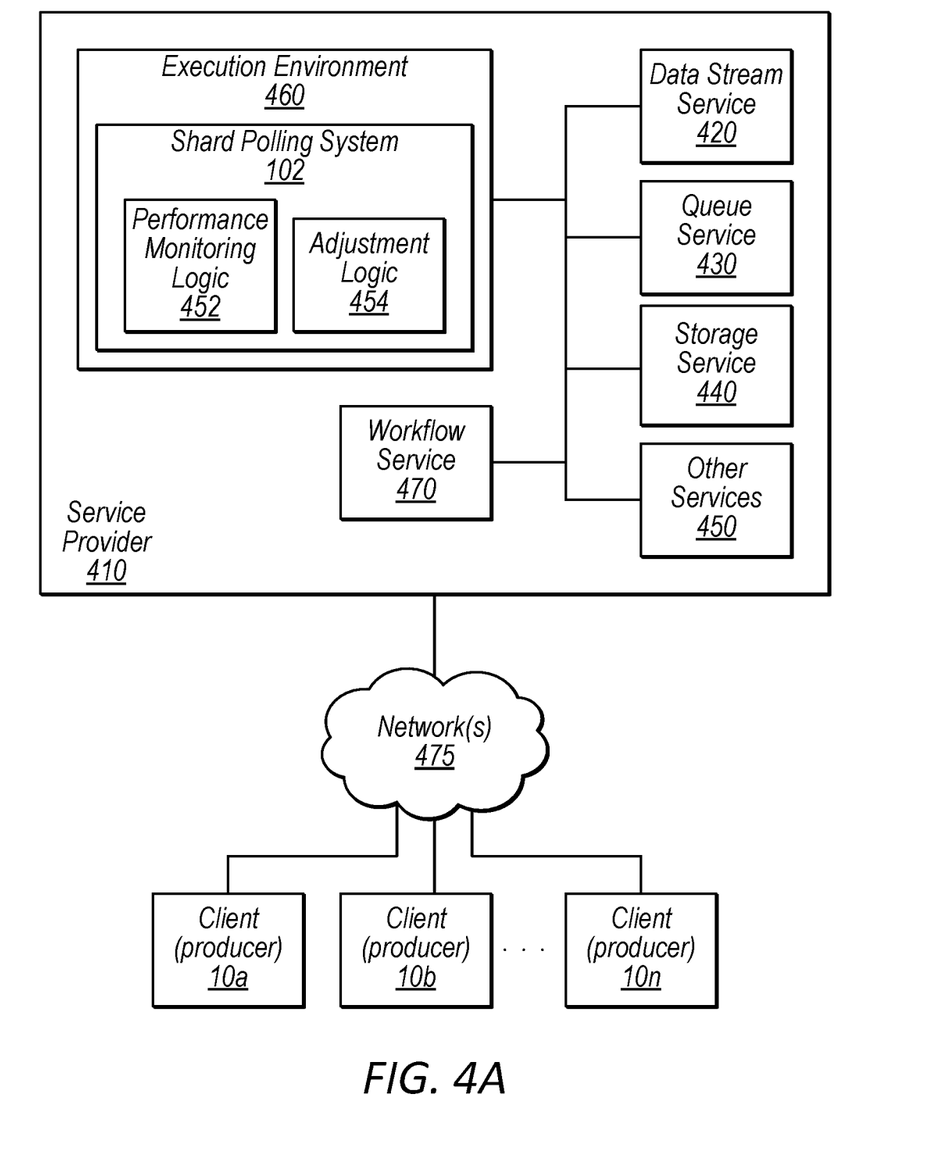
FIG. 4a illustrates an implementation of a shard polling system in a service provider that provides various services to customers, in accordance with some embodiments.
Figure 4B:
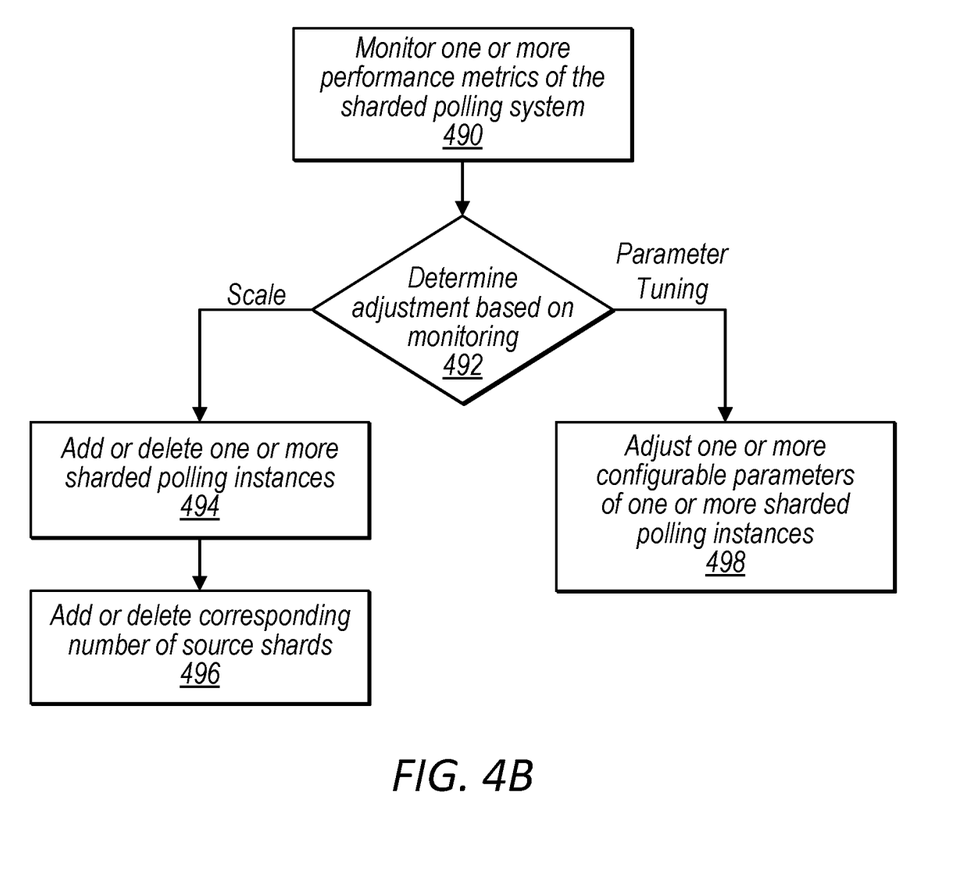
FIG. 4B is a flow chart of a process for monitoring and tuning a shard polling system, in accordance with some embodiments.

Generally, one or more of the components of the shard polling systems illustrated in FIGS. 1, 4A, 5, and 6 may perform one or more portions of the functionality illustrated in FIGS. 2, 3, and 4B. The illustrated embodiments are for the purpose of disclosure and clarity. Other architectures of a shard polling system as well as different sequences of the disclosed functionality are contemplated without departing from the scope of the invention.

FIG. 1 illustrates a shard polling system for polling of computer resources in accordance with some embodiments. Various components illustrated in FIG. 1 may perform functionality illustrated in FIGS. 2, 3, and 4B, for example.

In at least the illustrated embodiment, sources of data such as various producer data sources 10*a-n* store data to data stores (e.g., customer data producers of a service provider, or an enterprise backend, a streaming data service, storage buckets, other storage service, etc.). The data (items or messages, or the like) may be organized (e.g., sharded into shards 22*a*-22*n* according to a sharding scheme by a sharding system 20), as in the illustrated diagram. The sharding system 20 and corresponding sharding process may not be under control of the producers 10*a-n* that produce the items, and may be implemented by a service provider, in embodiments. Processes, such as internal workflows of a customer of a service provider, workflows or outside threads 32, 34, 36 of consumer processes 30 (or consumer services, in embodiments) that process items (e.g., messages, etc.) or the like consume or request the items from the data sources. In some embodiments (not illustrated), consumer processes may execute on the same machine as the shard polling system 102. The illustrated shard polling system 102 is a mechanism, that when polled by the consumer service 30, returns an item (e.g., a message) chosen fairly from the stored data of the producer services 10 (e.g., from the shards 22*a-n*), in embodiments. In embodiments, fair polling may indicate that polling is performed in a manner of equal quantity of items or polls, or equal time for each poll or response, or that retrieved data is of equal size, for example.

Numerous components of the shard polling system 102 are illustrated. A shard polling system may include more or fewer components, in embodiments, arranged similarly or differently than in the illustrated embodiment without departing from the scope of the invention.

Illustrated in particular are shard item pollers 111*a*-111*n* that may be assigned in a one-to-one relationship with portions of a data source, such as shards 22*a*-22*n* (polling processes 11*a-n* or shard queues may be assigned, in some embodiments). However, it is contemplated that multiple shard item pollers 111*a*-111*n* may be associated with any portion of stored data, such as a shard, in embodiments. Generally, the polling processes 110*a-n* poll respective shards 22*a-n* for items (messages from a message service, for example, or the like) and place the items into respective shard queues 114*a-n*. In embodiments, a single global process 124 obtains the items from each of the respective queues 114*a-n* in an ordered, fair fashion (e.g., using a round-robin or other fairness scheme) and places the items into a global queue 126, from which each of the consuming services 30 obtain the items.

Counters

Various counters are described in some architectures of a shard polling system 102. For example, shard permit counters 112*a-n* and a global permit counter 122 are illustrated. In some embodiments corresponding permits are described as drained from a counter or required in order to perform some action, for sake of clarity. An example implementation of draining a counter may include decrementing a counter, in embodiments. Permit counters may be refilled by incrementing the counter, in embodiments.

The illustrated polling processes 110*a-n* for each shard 22*a-n* assigned to the polling processes (or assigned to the shard item poller, in embodiments) are each associated with shard permit counters 112*a-n* that each maintain a respective count of a respective number of available shard permits (the permits may be required by each of the respective polling processes 110*a-n* in order to obtain items from respective shards 22*a-n* and the polling processes may not be able to poll shards for items if no permits are available from a corresponding shard permit counter, in embodiments). The illustrated counters may be implemented via semaphores, for example. Each shard permit counter 112*a-n* may be restricted by a configurable max count of permits parameter, or other parameters that act to restrict the number of items that can be placed into one of the shard queues 114*a-n* that are each associated with respective shards 22*a-n*. Parameters in the system, such as the max_count_of_permits parameter may be set by default and may be configurable, by an administrator or by the system tuning itself, in embodiments, as described below. In embodiments, shard permit counters 112*a-n* are decremented by respective polling processes 110*a-n* in order to obtain items from respective shards 22*a-n*, and incremented by a global process 124 when the global process 124 moves an item from the respective shard queue for the shard into a global queue 126 that receives items from each of the shard queues 114*a-n*. Polling processes 110*a-n* may continually check respective shard permit counters 112*a-n* for availability of permits (e.g., attempt to decrement the counter), in embodiments.

As described above, items generally move from respective shards 22*a-n* to respective shard queues 114*a-n* and then into a global queue 126. FIG. 1 illustrates a global permit counter 122 that represents the quantity of items presently available in all the shard queues 114*a-n* in the system. In embodiments, the global process 124 may be prevented from moving an item from one of the shard queues 114*a-n* to the global output queue 126 because the global permit counter is empty (has no permits to give the global process permission to move an item from a shard queue to the global output queue). For example, in the illustrated embodiment, the global process 124 must acquire a permit from the global permit counter 122 in order to poll a shard queue 114*a-n*. If the global permit counter has been decremented to empty or zero, the global process will wait for the global permit counter to be incremented. Generally, the global permit counter 122 is incremented by polling processes 110 when items are moved from shards 22*a-n* into respective shard queues 114*a-n* and decremented by the global process 124 when items are moved from shard queues 114*a-n* to global queue 126. In various embodiments, the global process 124 may batch process items from shard queues 114*a-n* to global queue 126 (e.g., obtaining several permits at once or decrementing the global counter by more than one in a single operation), or may move items from the shard queues to the global queue one-by-one, according to a fairness scheme that obtains one global permit at a time (e.g., decrements the global permit counter one move at a time).

Global queue 126 may be associated with a configurable and/or tunable global_queue_count_max parameter that indicates a maximum number of items that can be in a global queue 126. An output queue counter (not illustrated) may track the quantity of items in the global queue 126. Because, in at least some embodiments, a global_ouptut_queue_count_max may be less than the total of all the max_count_of_permits values summed across all of the counters 112a-n, the global process 124 that fairly polls for items across the shard queues 114a-n may have to wait for space within the global queue 126 to become available before fairly polling the shard queues. The global_queue_count_max acts as a restriction on the number of items that can be in the global queue 126 (a global queue counter) at any given time, in embodiments. The global_queue_count_max parameter may be set by default and may be configurable and/or tunable, by an administrator or by the system itself, in embodiments, as described below.

Reference to counters, some with atomic operations that atomically increment and decrement count values (e.g., shard permit counter, global permit counter) and to semaphores is made throughout this disclosure. One possible example of counters, counting semaphores, may be equipped with two operations, historically denoted as P and V. Operation V increments the semaphore S, and operation P decrements it. The value of the semaphore S is the number of units of the resource (e.g., permits) that are currently available. The P operation wastes time or sleeps until a resource protected by the semaphore becomes available, at which time the resource is immediately claimed. The V operation is the inverse: it makes a resource available again after the process has finished using it. One important property of semaphore S is that its value cannot be changed except by using the V and P operations.

A simple way to understand wait (P) and signal (V) operations is:
 wait: Decrements the value of semaphore variable by 1. If the new value of the semaphore variable is negative, the process executing wait is blocked (i.e., added to the semaphore's queue). Otherwise, the process continues execution, having used a unit of the resource
 signal: Increments the value of semaphore variable by 1. After the increment, if the pre-increment value was negative (meaning there are processes waiting for a resource), it transfers a blocked process from the semaphore's waiting queue to the ready queue.

Many operating systems provide efficient semaphore primitives that unblock a waiting process when the semaphore is incremented. This means that processes do not waste time checking the semaphore value unnecessarily. The counting semaphore concept can be extended with the ability to claim or return more than one "unit" from the semaphore.

In another example, a producer-consumer problem, one process (the producer) generates data items (e.g., messages) and another process (the consumer) receives and uses them. They communicate using a queue of maximum size N and are subject to the following conditions: (1) the consumer must wait for the producer to produce something if the queue is empty; (2) the producer must wait for the consumer to consume something if the queue is full.

The semaphore solution to the producer-consumer problem tracks the state of the queue with two semaphores: emptyCount, the number of empty places in the queue, and fullCount, the number of elements in the queue. To maintain integrity, emptyCount may be lower (but never higher) than the actual number of empty places in the queue, and fullCount may be lower (but never higher) than the actual number of items in the queue. Empty places and items represent two kinds of resources, empty boxes and full boxes, and the semaphores emptyCount and fullCount maintain control over these resources.

The binary semaphore useQueue ensures that the integrity of the state of the queue itself is not compromised, for example by two producers attempting to add items to an empty queue simultaneously, thereby corrupting its internal state. Alternatively, a mutex could be used in place of the binary semaphore, for example.

As explained above, a global process 124, restricted by a global permit counter 122 fairly polls the shard queues 114a-n for items and, for shard queues that have items, places the items from the shard queues into a global output queue 126. The global process 124 may implement a fairness algorithm via any of various fairness schemes or techniques, such as round-robin, weighted round robin, or slow-start, in deciding which of the shard queues is the next queue to poll for an item. Other techniques, such as most loaded (e.g., maintain a count of outstanding items in each queue, and obtain items from queues with the largest number of items), random, or Peak EWMA: maintain a moving average of each queue's round-trip time to move an item, weighted by the number of outstanding items in that queue, and obtain items from queues where that cost function is smallest, or greatest, in embodiments, are contemplated. Other fairness techniques are contemplated without departing from the scope of this disclosure.

Generally, the global process 124 must acquire a global permit from a global permit counter 122 (e.g., decrement a global permit counter 122) in order to poll one of the shard queues 114a-n. In some embodiments, the global process 124 must also determine that there is a spot available in the global queue 126 in order to have a place to put the item obtained from the queue. If either (or both) fail, the global process 124 may wait until both requirements are met (or either requirement is met, in embodiments), before obtaining (e.g., polling) an item from a next sharding queue 114a-n. The global process 124 may increment the respective shard permit counter 112a-n when a corresponding item is moved from the respective sharding queue 114a-n to the global queue 126. Such an action creates a permit in counter 112a (increments shard permit counter 112a) that may be used (decremented) by polling process 110a to obtain another item from shard 22a, for example. The global output queue 126 may be implemented by a standardized blocking queue with a standardized interface, in embodiments. It is contemplated that the global process 124 may obtain items from the sharding queues one-at-a-time from each sharding queue or may batch process-obtain multiple items from one shard queue before moving onto the next shard queue, for example.

In FIG. 1, outside threads 32, 34, 36 of one or more consumer processes 30 (or services) poll the global output queue 126 for items. In some embodiments, outside threads 32-36 can handle or process any item, message, or data obtained from any of shards 22a-n. It may not be necessary to coordinate particular requests from a particular outside thread with a particular shard, in embodiments, because the workers (e.g., outside threads 32-36) can do any job indicated in the items from the shards 22*a-n*. Items may be messages that are descriptions of work or jobs to be performed by the workers or threads, in embodiments. The consumer processes may be unaware of the shard polling system mechanism, in embodiments, as only an API to obtain items from the shards may be exposed, in some embodiments. In some embodiments (not illustrated), consumer processes may executed on the same machine as the shard polling system 102.

FIG. 2 is a flow chart of a process for polling of computer resources, by components of a shard polling system, in accordance with some embodiments. Functionality illustrated and described for FIG. 2 may be implemented by components illustrated in FIGS. 1, 4A, 5 and/or 6, in embodiments. For example, a shard polling system 102 may implement the functionality illustrated and described for FIG. 2, in embodiments.

A determination may be made as to how many permits (e.g., of a shard permit counter 112) are available from a shard permit counter (block 202). For example, a polling process 110*a* may make the determination by requesting the value of a shard permit counter 112*a*, implemented as a semaphore, in embodiments, that tracks a quantity of permits that are available in that shard item poller 111*a*. In some embodiments, the determination may be made by sending an atomic read-modify-write instruction to the shard permit counter 112*a*. If the value is zero—no permits are available—(block 202, no) the polling process 110*a* may continue checking whether permits are available. For example, if the shard permit counter 112*a* has been decremented to zero or has not been incremented from a default of zero, the polling process may continue to check the shard permit counter 112*a* until the shard permit counter (112*a*) is incremented.

If shard permits are available (the shard permit counter 112*a* is not zero), the shard permit counter 112*a* may be decremented by the quantity available (block 204), a respective shard polled for one or more item(s) (block 206), items added to a respective shard queue (block 208), and a global counter incremented by the quantity of items added in the shard queue (block 210). For example, the polling process 110*a* may decrement the shard permit counter 112*a* that tracks the number of permits that are available in the shard item poller 111*a*, then poll a respective shard 22*a* for that available number of items, add the items to the global output queue 126 and increment a global permit counter 122 by the quantity added in the shard queue 114*a*. In some embodiments, the polling process 110*a* may batch process all of the available permits at once, decrement the counter by the total batch size and increment the total counter by the batch size. In some cases (e.g., if the polling process is unable to process the entire batch at once and the polling process retains unused shard permits) the process may iterate (212, yes) and poll for the remaining items of the batch, to use all of the obtained permits. In some embodiments, the polling process may poll for each item individually, decrementing the shard permit counter 112*a* by a single unit and incrementing the global permit counter 122 by a single unit in individual iterations, as long as the shard permit counter has permits (e.g., is not zero). Decrementing and incrementing of counters can be performed in other orders than those described herein without departing from the scope of the disclosure. decrementing of the shard permit counter may be performed after items are added to a respective shard queue, for example.

A quantity of unused shard permits may be determined (block 210). For example, there may be unused permits for a polling process that batch processes permits/items if the entire batch could not be processed in one iteration. In another example, if the polling process does not successfully obtain an item for a single available permit (in the non-batch scenario), the permit would remain unused (block 212, yes) and the process would return to block 206, polling the shard for an item, again. If there are unused shard permits (210, yes) the process may return to block 206, polling the shard for items, etc. If all the permits have been used (block 210, no) the process may return to block 202, determining a quantity of available permits from polling the shard permit counter 112*a*.

FIG. 3 is a flow chart of a process for polling of computer resources, by components of a shard polling system, in accordance with some embodiments. Functionality illustrated and described for FIG. 2 may be implemented by components illustrated in FIGS. 1, 4A, 5 and/or 6, in embodiments. For example, a shard polling system 102 may implement the functionality illustrated and described for FIG. 3, in embodiments.

Global permit availability in the global permit counter may be determined (block 302). For example, a global thread 124 that fairly polls for items across the shard queues 114*a-n* may send a read-modify-write instruction to global permit counter 122 to determine global permit availability. In some embodiments, the read-modify-write instruction may instruct the global permit counter to decrement (e.g., decrement global permit counter (block 304)). If the response indicates that the global permit counter is empty (302, no), the process may continue to check the global permit availability (block 302). Otherwise, the global permit counter may be decremented, and a next shard selected according to a fairness algorithm (block 306). For example, global thread 124 may apply a fairness algorithm (e.g., round-robin, or otherwise) to select a next-in-turn shard or shard queue to poll for the next item. The selected shard queue is polled for an item (block 308). Generally, the global thread may poll an item from each shard queue one-at-a-time and in-turn. However, it is contemplated that the global thread may batch process several items from a shard queue at once or one item from each of several shard queues for each instance that permits are obtained from the global counter, in embodiments.

An attempt to obtain an item from selected shard queue (block 310). If the polled shard queue does not return an item (block 310, no) (e.g., the shard queue is empty), the process may return to block 306, and repeat, selecting a next shard according to the fairness algorithm. If the polled shard queue does return an item (310, yes) the shard permit counter for the selected shard is incremented (block 312), by the global thread 124, for example. It is attempted to put the item in a global output queue (block 314), by the global thread 124, for example. If the global output queue is full or the put is otherwise unsuccessful (block 316, no) the process may return to block 314 (attempt to put the item in the global output queue again, and so on). If the put is successful (block 316, yes) the entire process may repeat, starting over again at block 302 (determine that a global permit is available from the global permit counter).

Decrementing and incrementing of the global permit counter can be performed in other order than that described herein without departing from the scope of the disclosure. Decrementing of the global permit counter may be performed after items are added to the global output queue, for example.

FIG. 4A illustrates an implementation of a shard polling system in a service provider that provides various services to customers, in accordance with some embodiments. FIG. 4B is a flow chart of a process for monitoring and tuning a shard polling system, in accordance with some embodiments. In at least the illustrated embodiment of FIG. 4A, various components of shard polling system 102 are implemented via various services of a service provider 410. For example, the source of the items (illustrated as shards 22a-n in sharding system 20 of FIG. 1) can be items in queues of a queue service 430 of the service provider 410 in FIG. 4A. The source of items is intended broadly, and may include, other services 450, a data stream service 420, other storage service 460, or other sources such as buckets of a storage service 44 or the like, as a non-exhaustive list of examples. In the illustrated embodiment, clients (e.g. producers 10a-n) act as a source of messages that are stored in the queue service 430 in shards 22a-n. In at least the illustrated embodiment, workflow service 470 may act as at least one of the consumer processes 30, for example. In embodiments, various workflow service processes may execute on the same machine as the shard polling system 102.

In FIG. 4A, shard polling system 102 is illustrated as executing in an execution environment 450 of a service provider. Example execution environments 450 include any environment (e.g., any operating system or database management system) that can be run on virtualized machines and includes stateless execution environments, etc.

Shard polling system 102 is illustrated with performance monitoring logic 452 and adjustment logic 454. Generally, performance monitoring logic 452 monitors performance of the shard polling system 102, and adjustment logic 454 tunes parameters of the shard polling system 102 and/or scales shard polling system instances (up or down).

The functionality depicted in FIG. 4B may be performed by one or more components of a shard polling system 102, illustrated in FIGS. 1, 4A, 5 and 6, for example. The illustrated process starts by monitoring one or more performance metrics of the shard polling system (block 490). For example, performance monitoring logic 452 of shard polling system 102 in FIG. 4A may monitor performance metrics (e.g., flow metric values that measure flow of items or messages or permits) of the shard polling system 102. Performance metrics are intended to be construed broadly, and include metrics that measure performance of item flows anywhere along a path from a source (e.g., shards 22a-n) to, and through, various components of the shard polling system 102 and also to a destination such as the global output queue 126, for example. Maximum or average shard permit count, maximum or average shard queue length, maximum or average global permit count and maximum, volume of items from producers of shards, global batch size, or average global output queue size is a non-exhaustive list of example metrics.

An adjustment based on the monitoring is determined (block 492). For example, adjustment logic 454 may analyze the monitored metrics and determine whether to scale instances the shard polling system and/or tune parameters of the instantiated shard polling systems. If the system determines to scale the shard polling system (block 492, scale) one or more shard polling instances may be added or deleted (block 494). For example, adjustment logic 454 may instruct scaling of multiple shard polling systems, in response to an increase in items being produced by producers 10a-n. A corresponding number of source shards may be added or deleted (block 496).

If the system determines to perform parameter tuning (block 492, parameter tuning) the system may adjust (e.g., dynamically or otherwise) one or more configurable parameters of one or more shard polling instances (block 498). A non-exhaustive list of example parameters that may be tuned include maximum shard permit count, maximum batch item processing, maximum shard queue size, maximum global output queue size, etc. Dynamic adjustment may indicate an iterative process and/or a process that adjusts parameters as the system operates and/or indicates an iterative process of monitoring, tuning, monitoring again, tuning again, etc., for example.

Figure 5:
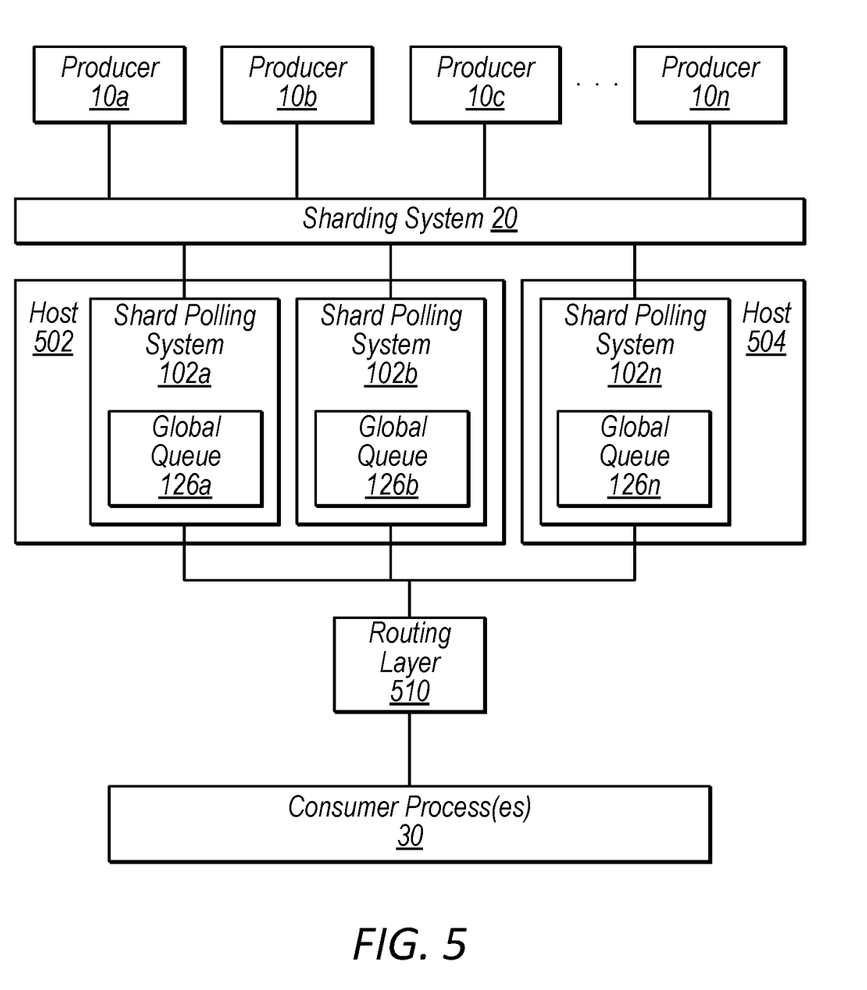
FIG. 5 is a block diagram that illustrates an implementation of a scaled group of shard polling systems, in accordance with some embodiments.

FIG. 5 is a block diagram that illustrates an implementation of a scaled group of shard polling systems, in accordance with some embodiments. Similar to FIG. 1, producers 10a-10n are illustrated and generate data, such as items or messages that are stored by sharding system 20 in shards 22a-n. Shard polling system 102a is scaled, in the illustrated embodiment, in response to an increase in data produced by producers 10a-n, in embodiments. The illustrated scaled system of two instances of shard polling system 102a and 102b on host 502 may be the result of instructions from adjustment logic 454 to add an instance of the shard polling system 102 to host 502, in embodiments. More instances of shard polling system 102 may be added, such as shard polling system 102n that has been added to another host 504, in the illustrated embodiment. FIG. 5 illustrates a routing layer 510 between consumer process(es) 30 that consume the data stored in the shards. The routing layer may be implemented in various ways, by one or more load balancers that apply a load balancing algorithm (e.g., round-robin or the like, etc.) to the consumer process requests for data to distribute the data moved through the multiple instances of the shard polling systems 102a-n. For example, a load balancer in routing layer 510 may query each of the global queues 126a-n, in turn, according to a round-robin type algorithm and provide the data from each of the global output queues 126a-n to the one or more consumer processes 30.

Example Computer System

Figure 6:
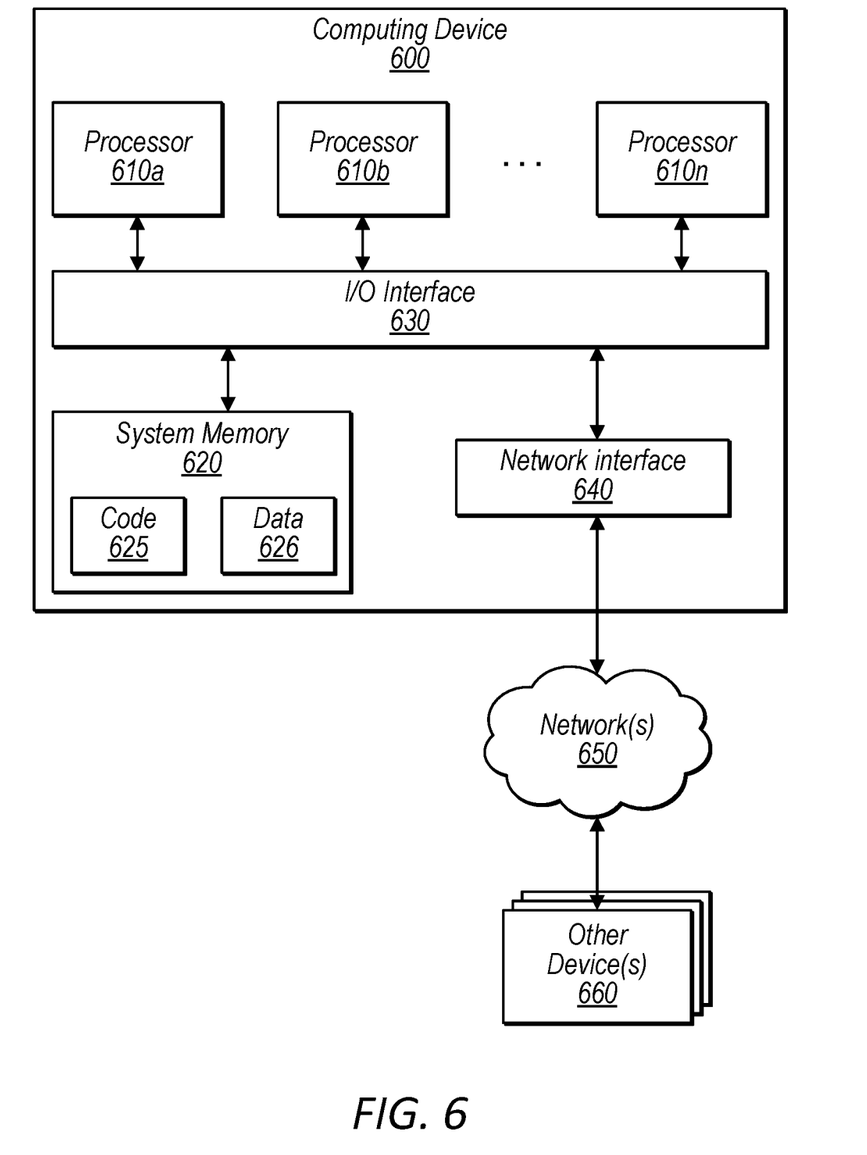
FIG. 6 illustrates a computer system for use in implementing a distributed load test system, or for implementing services of a service provider, according to embodiments.

FIG. 6 is a diagram that illustrates a computer system for use in implementing the disclosed shard polling system 102, according to one embodiment. Various portions of systems in FIGS. 1, 4 and 5 may be implemented by, and/or methods presented in FIGS. 2 and 3 described herein, may be executed on, one or more computer systems similar to that described herein, which may interact with various other devices of the system.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 660, such as cursor control device, keyboard, audio device, and display(s). In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for fair polling may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a shard polling system and method, are shown stored within system memory 620 as program instructions 625 and data storage 626, respectively. In other embodiments, program instructions and/or data may be received, sent, or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640. Program instructions may include instructions for implementing the techniques described with respect to any of the FIGS.

In some embodiments, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 600 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions 625, configured to implement embodiments of a shard polling system and methods as described herein, and data storage 626, comprising various data accessible by program instructions 625. In one embodiment, program instructions 625 may include software elements of a method illustrated in the above figures. Data storage 626 may include data that may be used in embodiments described herein. In other embodiments, other or different software elements and/or data may be included.

Those skilled in the art will appreciate that computer system 600 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more processors and memory configured to implement a sharded polling system comprising:
   a plurality of shard item pollers each configured to obtain items from a different shard of a plurality of source shards, each shard item poller comprising:
   a respective shard queue configured to queue items from an assigned shard of the plurality of shard sources;
   a respective shard permit counter configured to store a permit count indicating a quantity of available entries in the respective shard queue; and
   a respective shard polling process configured to obtain a number of shard permits from the respective shard permit counter, decrement the respective shard permit counter by the obtained number, poll the assigned shard source for a number of items limited by the obtained number of shard permits, put each obtained item in the respective shard queue, and increment a global permit counter for each item put in the respective shard queue; and
   a global poller comprising:
   the global permit counter;
   a global output queue configured to queue items from the respective shard queues and output the items to one or more consumers; and
   a global process configured to:
   check the global permit counter for an available global permit,
   decrement the global permit counter in response to obtaining a global permit,
   select a next shard queue of the respective shard queues of the plurality of shard item pollers according to a fairness algorithm, and
   in response to obtaining an item from the selected next shard queue, increment the respective shard permit counter for the selected next shard queue and add the obtained item to the global output queue.

2. The system of claim 1, further comprising:
   memory comprising program instructions that when executed by the one or more processors:
   monitor one or more performance metrics of the sharded polling system; and
   configure one or more parameters of the shard polling system based on said monitoring, wherein the one or more parameters include a maximum count size for the respective shard permit counters or a maximum queue size for the global output queue.

3. The system of claim 1, further comprising:
   memory comprising program instructions that when executed by the one or more processors:
   monitor one or more performance metrics of the sharded polling system;
   and scale the sharded polling system based on said monitoring, wherein said scale comprises:
   add or delete one or more sharded polling system instance, each sharded polling system instance comprising a respective plurality of shard item pollers and a respective global poller; and
   add or delete a corresponding number of source shards.

4. The system of claim 1, further comprising:
   one or more consumer threads configured to, for a plurality of items in the global output queue:
   request and receive one or more of the items from the global output queue; and
   perform one or more tasks as directed by instructions in the received one or more items.

5. The system of claim 1, wherein:
   each respective shard permit counter is limited to a maximum permit count size; and
   each respective shard permit counter and the global permit counter are implemented as respective semaphores.

6. A method, comprising:
   performing, by one or more computers:
   checking a global permit counter for an available global permit, wherein the global permit counter contains permits corresponding to a number of items available in a plurality of respective shard queues;
   in response to obtaining a global permit from the global permit counter as a result of the checking:
   decrementing the global permit counter;
   selecting a next shard queue of the plurality of respective shard queues according to a fairness algorithm; and
   in response to obtaining an item from the selected next shard queue:
   incrementing a respective shard permit counter for the selected next shard queue, wherein the respective shard permit counter limits a maximum number of items in the respective shard queue; and adding the obtained item to a global output queue configured to output the items to one or more consumers.

7. The method of claim 6, further comprising:
for one of the respective shard queues:
obtaining a number of shard permits from the respective shard permit counter for that shard queue, wherein the obtaining decrements the respective shard permit counter by the obtained number;
polling an assigned shard source for a number of items limited by the obtained number of shard permits;
putting each obtained item in the respective shard queue; and
incrementing the global permit counter for each item put in the respective shard queue.

8. The method of claim 7, wherein said obtaining comprises using an atomic operation to read and decrement the respective shard permit counter.

9. The method of claim 6, further comprising:
monitoring, by a performance monitor, the shard polling system to determine values for one or more flow metrics for the shard polling system; and
dynamically adjusting, based at least in part on the flow metric values, one or more configurable parameters of the shard polling system.

10. The method of claim 6, wherein said checking and decrementing the global permit counter are performed using one or more atomic operations.

11. The method of claim 6, wherein each respective shard permit counter is limited to a maximum permit count size.

12. The method of claim 6, wherein said selecting the next shard queue of the plurality of respective shard queues according to a fairness algorithm comprises selecting the next shard queue of the plurality of respective shard queues according to a round robin algorithm.

13. One or more non-transitory computer-readable storage media storing program instructions that when executed on or across one or more processors perform:
checking a global permit counter for an available global permit, wherein the global permit counter contains permits corresponding to a number of items available in a plurality of respective shard queues;
in response to obtaining a global permit from the global permit counter as a result of the checking:
decrementing the global permit counter;
selecting a next shard queue of the plurality of respective shard queues according to a fairness algorithm; and
in response to obtaining an item from the selected next shard queue:
incrementing a respective shard permit counter for the selected next shard queue, wherein the respective shard permit counter limits a maximum number of items in the respective shard queue; and
adding the obtained item to a global output queue configured to output the items to one or more consumers.

14. The one or more non-transitory media of claim 13, storing program instructions that when executed on or across one or more processors perform:
in response to failing to obtain a global permit from the global permit counter as a result of the checking, retrying the checking until a permit is obtained.

15. The one or more non-transitory media of claim 13, storing program instructions that when executed on or across one or more processors perform:
in response to failing to obtain an item from the selected next shard queue, selecting another next shard queue according to the fairness algorithm until an item is obtained.

16. The one or more non-transitory media of claim 13, wherein to perform said selecting the next shard queue according to a fairness algorithm, the media stores program instructions that when executed on or across one or more processors perform selecting the next shard queue according to a round robin fairness algorithm that selects the next shard queue in turn.

17. The one or more non-transitory media of claim 13, wherein:
the one or more processes that execute the instructions execute the instructions in an execution environment of a service provider; and
wherein the items are messages from a message queueing service provided by the service provider.

18. The one or more non-transitory media of claim 13, storing program instructions that when executed on or across one or more processors perform:
monitoring one or more performance metrics of the sharded polling system; and
configuring one or more parameters of the shard polling system based on said monitoring, wherein the one or more parameters include a maximum count size for the respective shard permit counters or a maximum queue size for the global output queue.

19. The one or more non-transitory media of claim 13, storing program instructions that when executed on or across one or more processors perform, for one of the respective shard queues:
obtaining a number of shard permits from the respective shard permit counter for that shard queue, wherein the obtaining decrements the respective shard permit counter by the obtained number;
polling an assigned shard source for a number of items limited by the obtained number of shard permits;
putting each obtained item in the respective shard queue; and
incrementing the global permit counter for each item put in the respective shard queue.

20. The one or more non-transitory media of claim 13, storing program instructions that when executed on or across one or more processors perform said checking and decrementing of the global permit counter using an atomic operation.

* * * * *